UNITED STATES PATENT OFFICE.

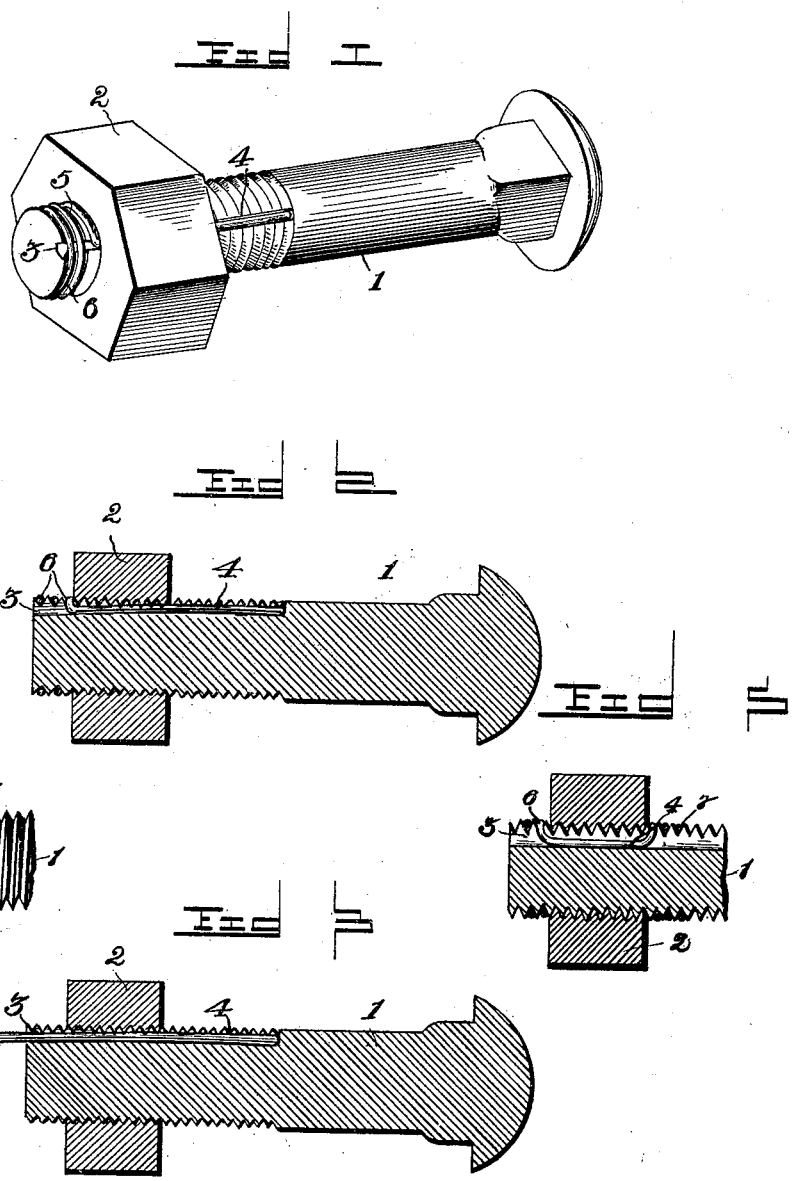

WILLIAM H. DE BRAE, OF PLEASANT HILL, OHIO, ASSIGNOR OF TWO-THIRDS TO WILLIAM A. RAUDABAUGH, OF SAME PLACE, AND JOSHUA R. RAUDABAUGH, OF CELINA, OHIO.

NUT-LOCK.

SPECIFICATION forming part of Letters Patent No. 644,062, dated February 27, 1900.

Application filed May 8, 1899. Serial No. 715,948. (No model.)

*To all whom it may concern:*

Be it known that I, WILLIAM H. DE BRAE, a citizen of the United States, residing at Pleasant Hill, in the county of Miami and State of Ohio, have invented a new and useful Nut-Lock, of which the following is a specification.

This invention relates to nut-locks of that class embodying a longitudinal groove formed across the threads of a bolt and a key adapted to be inserted into the groove to bind the nut and bolt together; and the object of the invention is to provide improvements in this class of nut-locks, whereby the positioning and removal of the nut is facilitated and the threads of both the nut and the bolt are not damaged, whereby the device may be used a plurality of times.

To this end the present invention consists in the combination and arrangement of parts, as will be hereinafter more fully described, shown in the accompanying drawings, and particularly pointed out in the appended claim.

In the drawings, Figure 1 is a perspective view of the device. Fig. 2 is a sectional view thereof, taken longitudinally through the groove in the bolt. Fig. 3 is a similar view before the wire has been twisted upon the bolt. Fig. 4 is a side elevation of a modified form of the invention. Fig. 5 is a longitudinal sectional view thereof.

Corresponding parts are designated by like reference characters in all the figures of the drawings.

Referring to the accompanying drawings, 1 designates a bolt of common form having a nut 2 fitted thereto in the usual manner. Provided longitudinally of the bolt and extending a suitable distance across the threads thereof is a groove 3, opening out at one end through the threaded end of the bolt. It will be noted by reference to Fig. 2 that this groove decreases in depth from the outer to the inner end thereof.

The means for locking the nut to the bolt consists of a key formed of a single length of pliable wire 4, which is adapted to be seated in the groove formed in the bolt and project a suitable distance beyond the end of the bolt. By reference to Fig. 3 it will be seen that for a distance inward from its outer open end, equal to the thickness of the nut, the groove is deep enough to seat the wire within the circumference of the base of the threads of the bolt, whereby the nut may be fitted upon the bolt a suitable distance to hold thereon before the nut begins to bind upon the wire. The gradual decreasing depth of the groove brings the wire gradually into the path of the threads of the nut, and as the latter is screwed upon the bolt the threads thereof bite into the wire, and thereby bind the same between the bolt and the nut and prevent longitudinal movement or displacement of the wire.

When the nut has been fitted to its desired position upon the bolt inward from the threaded end thereof, the projecting end portion 5 of the wire is twisted about the outer projecting end of the bolt and tightly between adjacent threads thereof, as illustrated at 6, Figs. 1 and 2, to provide a stop located against the outer face of the nut. The wire may be wrapped or twisted one or more times about the bolt as desired or occasion requires, and the wraps thereof filling the groove between adjacent threads of the bolt prevent accidental loosening or unscrewing of the nut. In removing the nut it is only necessary to untwist the coils or wraps of the wire and straighten the same out in line with the groove in the bolt, when the nut is free to be unscrewed.

It will be understood that the wire being pliable is comparatively soft, whereby the hard threads of the nut are capable of biting into the wire without damage to the said threads, and thus permits of a renewed use of the nut.

A modified form of the invention is shown in Figs. 4 and 5 in which the groove 3 in the bolt is of the same depth throughout, so that the threads of the nut may not engage with the key 4. To prevent longitudinal displacement of the key, the inner end thereof is twisted or coiled about the bolt, as at 7, prior to the positioning of the nut. The nut is then fitted to the bolt and the outer projecting end of the wire key is twisted about the end of the bolt and against the outer face of the nut in the same manner as described for the first form. This latter form locks the nut against movement in opposite directions, and thereby prevents accidental tightening of the nut, as will be understood.

The present invention provides an exceedingly simple and inexpensive device, requiring in addition to the common type of bolt and nut only a groove formed in the bolt and a single length of pliable wire and permits of the ready positioning and removal of the nut without damaging either the bolt or the nut.

Changes in the form, proportion, size, and the minor details of construction within the scope of the appended claim may be resorted to without departing from the spirit or sacrificing any of the advantages of the present invention.

What I claim is—

In a nut-lock, the combination with a bolt, the screw-threaded portion of which is provided with a longitudinal groove extending from its tip inward, the outer portion of the groove being deeper than the inner portion, of a nut upon the bolt, and a key of uniform diameter throughout its length, said diameter being less than the depth of the outer portion of the groove and greater than the inner portion thereof, said key being of a greater length than the groove and of softer material than the nut, whereby the threads of the nut may be embedded within the inner end of the key, and the outer end of the key may be bent around the bolt outside of the nut.

In testimony that I claim the foregoing as my own I have hereto affixed my signature in the presence of two witnesses.

WILLIAM H. DE BRAE.

Witnesses:
 FRED DEETER,
 G. W. WHITMER.